E. C. MARTET.
WEDGE OPERATED LOCKING ARRANGEMENT FOR SLIDING MEMBERS.
APPLICATION FILED OCT. 12, 1917.
1,357,576.
Patented Nov. 2, 1920.
2 SHEETS—SHEET 1.
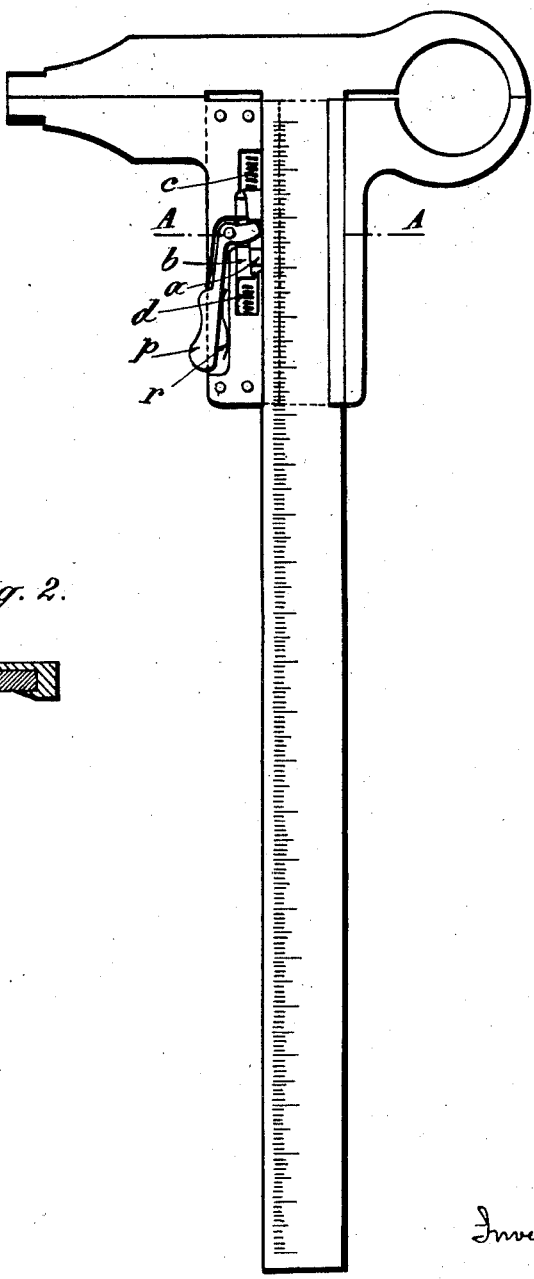
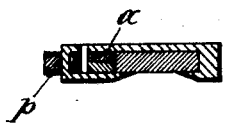

E. C. MARTET.
WEDGE OPERATED LOCKING ARRANGEMENT FOR SLIDING MEMBERS.
APPLICATION FILED OCT. 12, 1917.
1,357,576.
Patented Nov. 2, 1920.
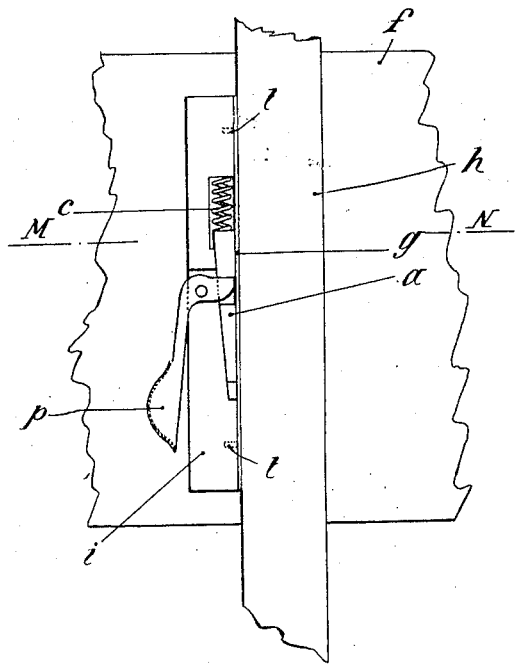
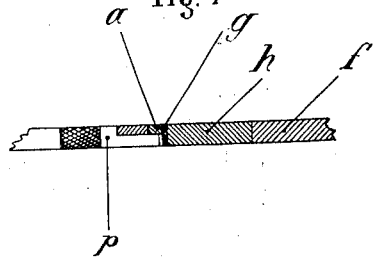
Inventor
Eugène Claude Martet
by
his Attorney

UNITED STATES PATENT OFFICE.

EUGÈNE CLAUDE MARTET, OF PARIS, FRANCE, ASSIGNOR TO LA PRECISION MECANIQUE, OF PARIS, FRANCE.

WEDGE-OPERATED LOCKING ARRANGEMENT FOR SLIDING MEMBERS.

1,357,576.   Specification of Letters Patent.   Patented Nov. 2, 1920.

Application filed October 12, 1917. Serial No. 196,298.

*To all whom it may concern:*

Be it known that I, EUGÈNE CLAUDE MARTET, a citizen of the Republic of France, residing at Paris, France, have invented new and useful Improvements in Wedge-Operated Locking Arrangements for Sliding Members, of which the following is a specification.

This invention has for its object a wedge operated locking arrangement by which automatic and instantaneous immobility of a sliding member can be produced by simple release of a lever serving to operate it.

In the accompanying drawings there is shown by way of example a locking arrangement according to the invention applied to a slide gage.

Referring to the drawings, Figure 1 is a front view of the slide gage the retaining plate of the locking arrangement being omitted in order to permit the whole arrangement to be seen.

Fig. 2 is a section on the line A—A of Fig. 1, the retaining plate being assumed to be in position.

Fig. 3 is a view similar to Fig. 1 of a modified form of the invention; and Fig. 4 is a section on the line M—N of Fig. 3.

In the example given the slide is formed by the vernier in which the rod slides with slight friction.

The locking arrangement comprises, as shown two wedges $a$ and $b$ respectively under the control of springs $c$ and $d$ which normally press these two wedges against one another and engage them in the space between the rod and the slide thus producing locking action.

When in order to move the sliding member the lever $p$ inclosed in the body of the sliding member is pressed the locking arrangement is automatically released. The pivoting movement of the lever causes displacement of the wedge $a$ which is pushed upward compressing its spring $c$ and so long as this lever is pressed the two wedges are maintained apart thus allowing the sliding member to move freely along the rod. When the pressure exerted is relieved the lever is returned to position under the action of its spring $r$ and permits the wedge $a$ to re-assume its locking position. The slide is thus instantaneously immobilized on the rod.

It is to be noted that the length of the wedges is such as to permit of the taking up of play due to wear.

The arrangement of the lever may be reversed according to the purposes for which the slide is intended and the wedges may be more or less large according to the space at disposal for applications of any kind where this locking slide may be employed.

Referring to the modified form of invention shown in Figs. 3 and 4, it will be observed that a spring blade $g$ is placed between the wedge $a$ of the sliding member $f$, and the rod $h$, this spring being attached to the frame $i$ of the device by two pins $t$.

This spring separates the wedge from the rod, and its use between these two parts avoids all action of the wedge upon the rod when the wedge is operated by the lever $p$.

Moreover the locking arrangement is entirely contained within the frame $i$ which is completely closed on the side next the rod $h$ by said spring blade $g$.

When the sliding member is removed from the rod by sliding it off the end of said rod, the spring blade $g$ prevents any abnormal movement of the working parts, and the sliding member can be replaced upon the rod in exactly the same way as for an ordinary sliding member without locking arrangement.

Having now described my invention, what I claim as new and desire to secure by Letters Patent is:

1. A locking means for a sliding member comprising in combination a rod, a sliding member adapted to be shifted along said rod, a piece adapted to bear against a wall of the sliding member said piece having an inclined plane, a coöperating wedge inserted between said inclined plane and the rod, means for forcing the wedge into contact with said inclined plane and positive means for separating the wedge from the piece.

2. A locking means for a sliding member comprising in combination a rod, a sliding member, adapted to be shifted along said rod, a piece adapted to bear against a wall of the sliding member said piece having an inclined plane, a coöperating wedge inserted between said inclined plane and the rod, a spring adapted to force the wedge into contact with said inclined plane, and a lever adapted to separate the wedge from the piece.

3. A locking means for a sliding member, comprising in combination: a rod, a sliding member adapted to be shifted along said rod, a piece adapted to bear against a wall of the sliding member, said piece having an inclined plane, a spring blade extending between said piece and the rod, a wedge inserted between said inclined plane and the spring blade, a spring adapted to force the wedge into contact with said inclined plane, and a lever adapted to separate the wedge from the piece.

In testimony whereof I have signed my name to this specification in the presence of two subscribing witnesses.

EUGÈNE CLAUDE MARTET.

Witnesses:
  LOUIS MOSES,
  CHAS. P. PRESSLY.